United States Patent
Fossati et al.

[11] Patent Number: 6,120,931
[45] Date of Patent: Sep. 19, 2000

[54] LEAD-ACID ACCUMULATOR, PARTICULARLY FOR MOTOR VEHICLES

[75] Inventors: Giuseppe Fossati, Mozzanica; Marco Bassini, San Bassano; Giordano Ferla, Capralba, all of Italy

[73] Assignee: Societa Industriale Accumulatori SpA, Bergamo, Italy

[21] Appl. No.: 09/112,238

[22] Filed: Jul. 9, 1998

[30] Foreign Application Priority Data

Jul. 10, 1997 [IT] Italy ................................. TO97A0614
May 25, 1998 [IT] Italy ................................. TO98A0446

[51] Int. Cl.[7] .......................... H01M 2/12; H01M 10/52
[52] U.S. Cl. .................................. 429/72; 429/82; 429/84
[58] Field of Search .................... 429/72, 53, 56

[56] References Cited

U.S. PATENT DOCUMENTS

| | | |
|---|---|---|
| 3,909,302 | 9/1975 | Mermelstein ........................... 136/177 |
| 4,002,495 | 1/1977 | Hakarine . |
| 4,237,526 | 12/1980 | Wood . |
| 5,417,743 | 5/1995 | Dauber ........................................ 96/13 |

FOREIGN PATENT DOCUMENTS

| | | |
|---|---|---|
| 0389769 | of 1990 | European Pat. Off. . |
| 1543874 | of 1968 | France . |
| 1572642 | of 1969 | France . |
| 7619657 | of 1977 | Germany . |
| 2751754 | of 1979 | Germany . |
| 61-161656 | of 1986 | Japan . |
| 61-7564 | of 1986 | Japan . |
| 61-161655 | 7/1986 | Japan .............................. H01M 2/12 |
| 62-115655 | of 1987 | Japan . |
| 62-122054 | of 1987 | Japan . |
| 62-157672 | 7/1987 | Japan .............................. H01M 2/12 |

*Primary Examiner*—Maria Nuzzolillo
*Assistant Examiner*—Mark Ruthkosky
*Attorney, Agent, or Firm*—Sughrue, Mion, Zinn, Macpeak & Seas, PLLC

[57] ABSTRACT

The accumulator comprises a container or vessel with a plurality of holes which define vent ducts for the gases developed in the accumulator. A filtering element is provided in each duct for allowing gases to pass through but preventing the electrolyte from passing through. The filtering element is constituted by a porous substrate combined with a polytetrafluoroethylene membrane.

9 Claims, 3 Drawing Sheets

LEAD-ACID ACCUMULATOR, PARTICULARLY FOR MOTOR VEHICLES

DESCRIPTION

Background of the Invention

The present invention relates to a lead-acid accumulator, particularly for use in motor-vehicles.

More specifically, the subject of the invention is a lead-acid accumulator comprising a container or vessel having at least one opening defining a vent duct for the discharge to the atmosphere of the gases developed in the accumulator, a filtering element being disposed in the duct for allowing the gases to pass through but preventing the electrolyte from passing through.

In a lead-acid accumulator, the gases which are vented to the atmosphere may carry small quantities of electrolyte with them in aerosol form.

In order to prevent the electrolyte from leaving the accumulator, and thus to reduce acid aerosol emissions, filtering elements constituted by discs or pellets of sintered plastics material, particularly polypropylene or polyethylene or of sintered ceramic material, have been proposed. Plastics filtering elements formed in this manner succeed in filtering the acid aerosol but only for a limited period of time. After a certain time, filtering elements made of these materials in fact become impregnated with electrolyte and their filtering action is thus lost.

SUMMARY OF THE INVENTION

Ceramic filtering elements are very expensive.

The object of the present invention is to provide a lead-acid accumulator of the aforementioned type with a plastics filtering element or filtering elements having improved characteristics.

This object is achieved, according to the invention, by means of an accumulator of the type specified above, having the specific characteristics recited in the following claims.

BRIEF DESCRIPTION OF THE DRAWINGS

Further characteristics and advantages of the invention will become clear from the following detailed description, given with reference to the appended drawings, provided purely by way of non-limiting example, in which.

DETAILED DESCRIPTION OF THE INVENTION

Figure 1:
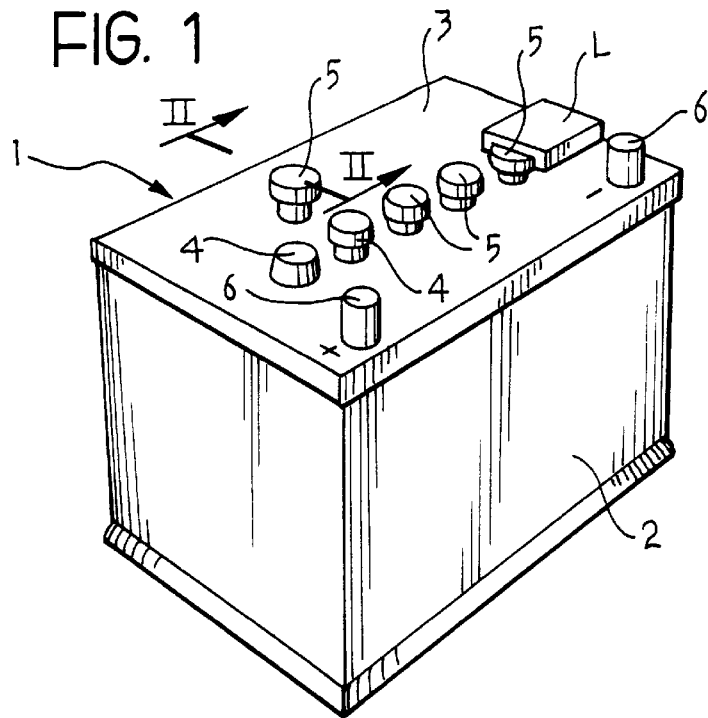
FIG. 1 is a perspective view of a motor-vehicle storage battery.

In FIG. 1, a motor-vehicle storage battery is generally indicated 1. The battery comprises, in known manner, a substantially parallelepipedal, unitary container 2 in the upper wall or face 3 of which there are topping-up holes 4 with which respective closure elements in the form of plugs 5 are associated. The terminals or poles of the battery 1 are indicated 6.

Figure 2:
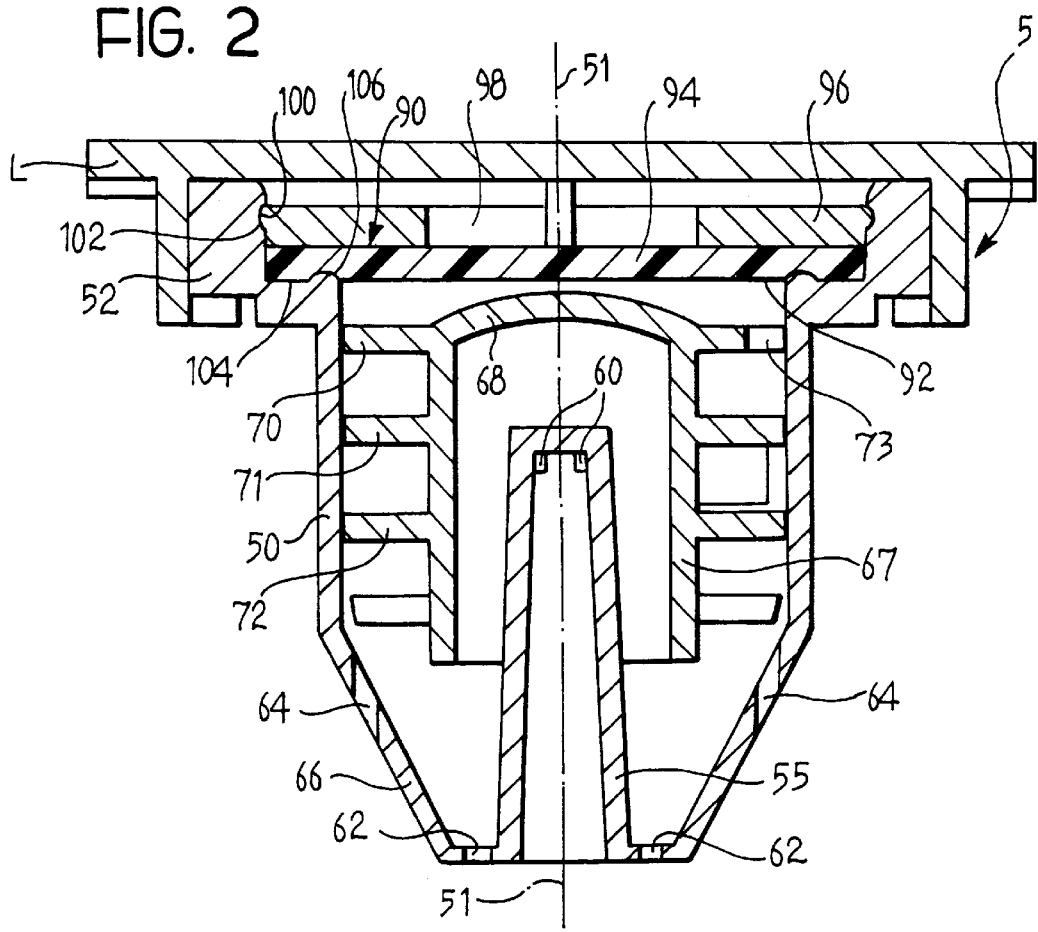
FIG. 2 is a section taken on the line II—II of FIG. 1, showing a closure element in the form of a plug for a topping-up hole of the battery of FIG. 1, the plug incorporating a filtering element according to the invention.

With reference to FIG. 2, the plug element 5 has a central cylindrical portion 50 with an opening 51 in its base, and an enlarged end portion 52.

Extending upwards from the edge of the opening 51, inside the central portion 50, is an integral extension 55 the end of which is disposed at a lower level than the end portion 52.

The integral extension 55 has openings 60 in its upper portion.

A plurality of openings or holes 62 and 64 are formed in the base of the central portion 50 and in its inclined side portion 66, respectively.

In the central portion 50, above and around the tubular portion 55, there is a tubular element 67 which is closed at its upper end by a wall 68 and from the outer lateral surface of which walls 70, 71, 72 extend, forming an open spiral.

There is an aperture 73 between the wall 70 and the internal surface of the central portion 50 on the side facing towards the outer flange 52.

A filtering element, indicated 90, is constituted by a porous substrate 92 made of polypropylene fibres, glass fibres, polyester fibres or polytetrafluoro-ethylene fibres, and covered by a polytetrafluoro-ethylene membrane 94 having pores with diameters of from 1 to 3 microns and a thickness of from 5 to 40 microns.

The polypropylene, glass or polyester fibres may, alternatively, be impregnated with polytetrafluoro-ethylene, with or without application to the membrane.

The unit comprising the substrate 92 and the membrane 94 is held in position by an annular pressure element 96 which is fitted with shaped coupling in the internal wall of the enlarged end portion 52.

This shaped coupling is achieved by virtue of a radial projection 100 on the periphery of the pressure element 96 which snap-engages in a complementary seat 102 formed in an internal wall of the enlarged end portion 52 of the tubular element 50.

The filtering element 90 is disposed on an annular bearing seat having a radially flat portion 104; an adjacent projection 106 may also be provided, extending axially towards the filtering element 90 with which it engages.

The pressure element 96 has a circular opening 98 which is in communication with the outside atmosphere.

The plug elements 5 are then covered with a conventional strip L.

In use, the gases developed in a cell of the battery are propagated inside the central portion 50 both inside the tubular element 55 through the opening 51, emerging through the openings 60, and through the openings or holes 62 and 64.

The gases thus pass through the open spiral formed by the walls 70, 71, 72 of the tubular element 67, through the aperture 73, to the filtering element 90 from which they emerge towards the outside atmosphere through the circular opening 98.

The filtering element 90 stops the particles of electrolyte carried in suspension by the gases.

Polytetrafluoroethylene has been found to have acid-repellent properties and filtering elements made of this material do not become impregnated with electrolyte.

Polytetrafluoroethylene is also a fireproof material and, when used in accumulators, does not therefore permit the propagation of flames into the accumulator from the exterior.

Figure 3:
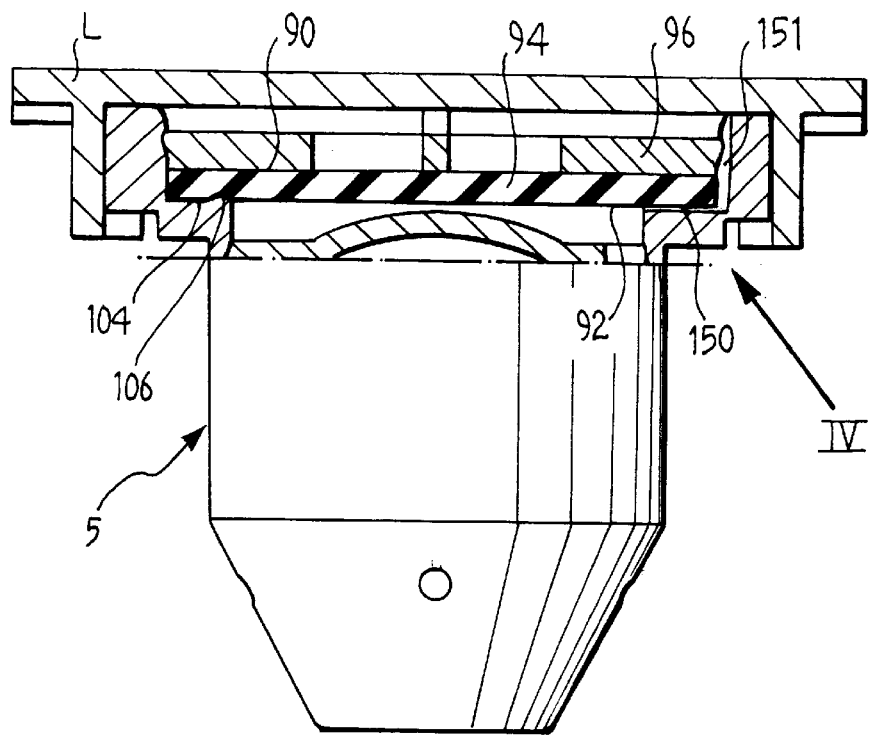
FIG. 3 shows a first variant of the closure element shown in FIG. 2.
Figure 4:
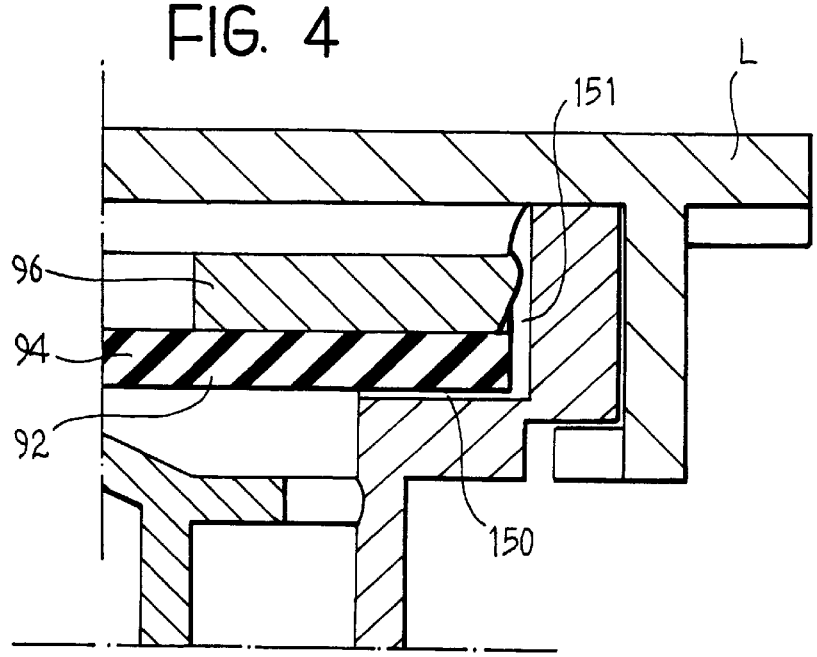
FIG. 4 shows a detail of FIG. 3, on an enlarged scale.
Figure 5:
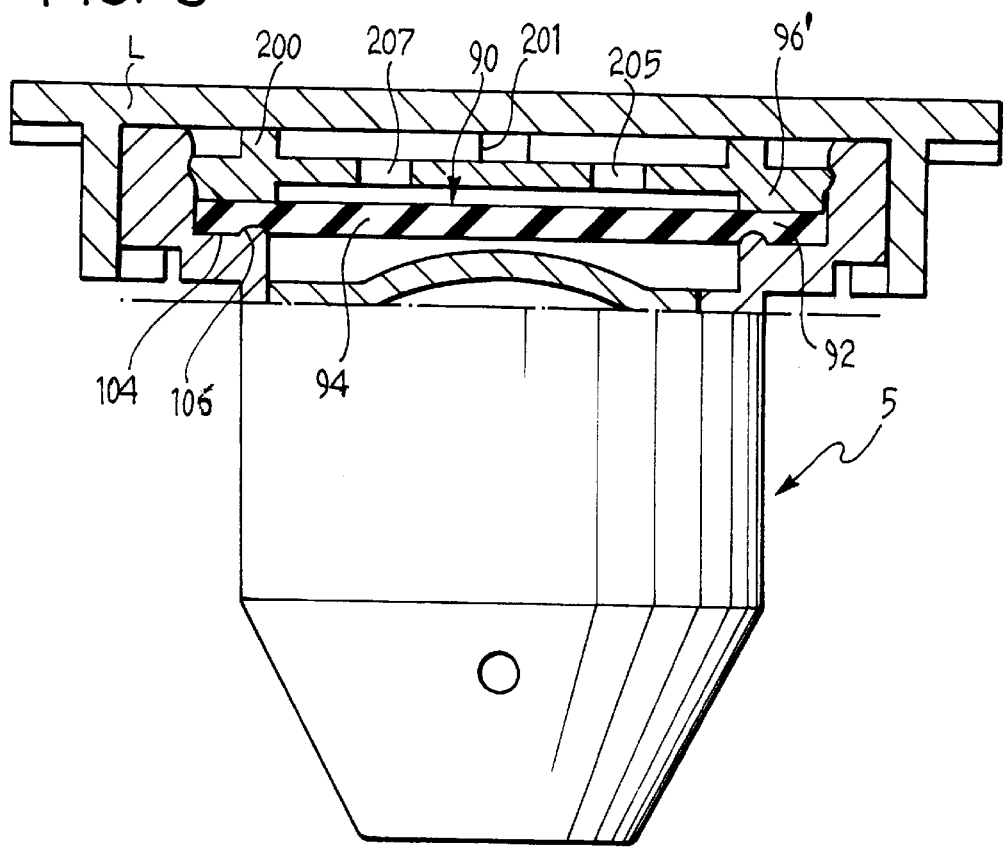
FIG. 5 shows a second variant of the closure element shown in FIG. 2.
Figure 6:
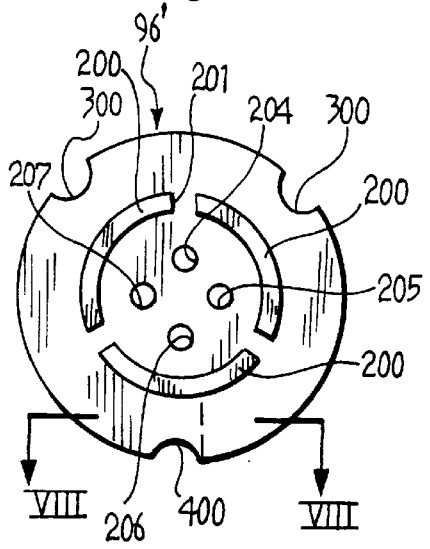
FIG. 6 is a view of a detail of FIG. 5 from above.
Figure 7:
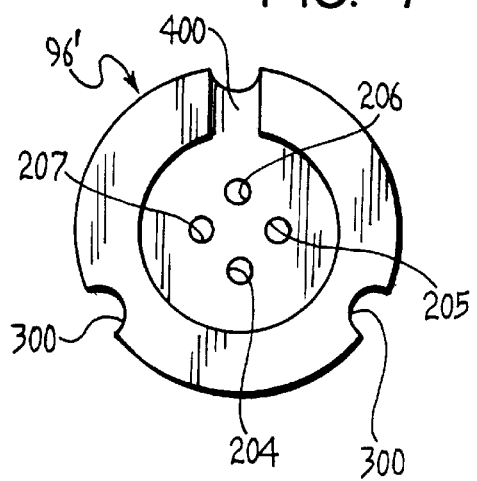
FIG. 7 is a view of the detail of FIG. 6 from below.
Figure 8:
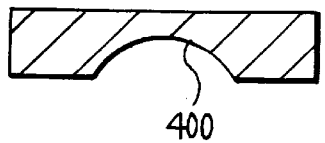
FIG. 8 is a section taken on the line VIII—VIII of FIG. 7.

With reference now to FIGS. 3 and 4, which show a first variant of the closure element shown in FIG. 2, a duct-like shaping or conduit-like notch 150, 151 is formed in the internal body of the closure element 5 in the vicinity of the periphery of the filtering element 90.

This duct-like shaping or conduit-like notch 150, 151, creates a lower pressure of the filtering element 90 on the annular bearing seat 104. If an excessive pressure is established inside the accumulator for any reason, this lower coupling pressure causes the filtering element 90 to lift locally and the gases consequently to escape.

With reference to FIGS. 5–8, which show a second variant of the closure element shown in FIG. 2, the pressure element is indicated 96'. This pressure element 96' has a plurality of central through-holes 204, 205, 206, 207 for discharging the gases in normal operative conditions, and a plurality of projections 200.

The pressure element 96' has a plurality of through notches 300 and blind notches 400, which create a lower pressure of the filtering element 90 on its bearing and sealing seat 104, 106 in the locations of the notches. If an excessive pressure is established inside the accumulator for any reason, this lower coupling pressure causes the filtering element 90 to lift locally and the gases consequently to escape.

Finally, both the duct- or conduit-like shapings 150, 151 of FIGS. 3 and 4 and the through notches 300 and blind notches 400 of FIGS. 5–8 have a safety function since, if the filtering membrane 94 is accidentally blocked during the life of the battery, they cause a preferential emission of gas in their locations, thus preventing dangerous pressures from being reached inside the battery.

Naturally, the principle of the invention remaining the same, the forms of embodiment and details of construction may be varied widely with respect to those described and illustrated purely by way of non-limiting example, without thereby departing from the scope of the present invention.

What is claimed is:

1. A lead-acid accumulator comprising a container having at least one hole in an upper surface thereof, a tubular plug disposed in said hole and having a vent duct for discharging gasses developed in said accumulator to the atmosphere, a filtering element disposed in an annular bearing seat formed in an outer end portion of the tubular plug and an open pressure element secured to an internal wall of the tubular plug in engagement with said filtering element to hold said filtering element in position on said seat, wherein said filtering element is comprised of a porous substrate covered by a polytetra-fluoroethylene membrane and wherein said pressure element is provided with a plurality of vent holes for discharging gasses in normal operative conditions and at least one peripheral notch and at least one blind notch in a surface of the pressure element disposed in engagement with said filtering element which allows displacement of said filtering element adjacent said blind notch to permit gasses to escape through said blind notch and said peripheral notch under excessive pressure conditions in said accumulator.

2. An accumulator according to claim 1, wherein the porous substrate is made of polyester fibres.

3. An accumulator according to claim 1, wherein the porous substrate is made of glass fibres.

4. An accumulator according to claim 1, wherein the porous substrate is made of polypropylene fibres.

5. An accumulator according to claim 1, wherein the porous substrate is made of polytetrafluoroethylene fibres.

6. An accumulator according to claim 1, wherein the porous substrate is made of fibres impregnated with polytetrafluoroethylene.

7. An accumulator according to claim 1, wherein said pressure element is secured to said internal wall of the tubular plug by a shaped coupling therebetween.

8. An accumulator according to claim 1, wherein said bearing seat has a radially flat region with a projection extending upwardly therefrom toward said filtering element for engaging said filtering element disposed on the bearing seat.

9. An accumulator according to claim 1, wherein the pressure element has a plurality of spaced apart upwardly extending projections on an upper surface thereof for engagement with a covering element.

* * * * *